United States Patent [19]

Fellows et al.

[11] Patent Number: 5,395,292

[45] Date of Patent: Mar. 7, 1995

[54] TRANSMISSIONS OF THE TOROIDAL-RACE ROLLING-TRACTION TYPE

[75] Inventors: Thomas G. Fellows, Barnet; Christopher J. Greenwood, Preston; Philip D. Winter, Blackburn, all of England

[73] Assignee: Torotrak (Development) Limited, United Kingdom

[21] Appl. No.: 102,547

[22] Filed: Aug. 5, 1993

Related U.S. Application Data

[63] Continuation of Ser. No. 689,774, May 15, 1991, abandoned.

[30] Foreign Application Priority Data

Nov. 21, 1988 [GB] United Kingdom ............... 8827140
Jan. 30, 1989 [GB] United Kingdom ............... 8901982

[51] Int. Cl.$^6$ ............................................. F16H 15/08
[52] U.S. Cl. ........................................ 476/10; 476/42
[58] Field of Search ................... 476/10, 42, 46, 39, 476/40, 41, 48

[56] References Cited

U.S. PATENT DOCUMENTS

| | | | |
|---|---|---|---|
| 744,550 | 11/1903 | Hoffman | 74/200 |
| 1,865,102 | 6/1932 | Hayes. | |
| 2,016,248 | 10/1935 | Schmitter | 74/200 |
| 2,113,638 | 4/1938 | Almen | 74/200 |
| 2,130,314 | 9/1938 | Brown | 200/74 |
| 2,325,502 | 7/1943 | Georges | 74/200 |
| 2,959,972 | 11/1960 | Madson | 74/200 |
| 2,959,973 | 11/1960 | Madson | 74/200 |
| 3,242,748 | 3/1966 | Prager | 476/39 |
| 3,653,272 | 4/1972 | Scheiter | 74/200 X |
| 3,802,284 | 4/1974 | Sharpe et al. | 74/200 |
| 3,933,054 | 1/1976 | Iseman | 200/74 |
| 4,186,616 | 2/1980 | Sharpe | 74/200 |
| 4,281,559 | 8/1981 | Sharpe | 74/200 |
| 4,499,782 | 2/1985 | Perry | 476/42 X |
| 4,524,641 | 6/1985 | Greenwood | 74/190 X |
| 5,048,359 | 9/1991 | Nakano | 74/200 X |

FOREIGN PATENT DOCUMENTS

| | | | |
|---|---|---|---|
| 3002034 | 7/1981 | Germany | 476/39 |
| 223831 | 1/1943 | Switzerland | 74/200 |
| 1076518 | 7/1967 | United Kingdom | 74/201 |
| 1395319 | 5/1975 | United Kingdom. | |
| 1600972 | 10/1981 | United Kingdom. | |
| 2250326 | 6/1992 | United Kingdom | 476/42 |

Primary Examiner—Dirk Wright
Assistant Examiner—Khoi Q. Ta
Attorney, Agent, or Firm—Davis, Bujold & Streck

[57] ABSTRACT

A roller control system for a continuously-variable-ratio transmission of the toroidal race, rolling traction type, in which rollers (60) of variable orientation transmit traction between a part-toroidal race (85) formed on an input disc (61) and a similar race (87) formed on a coaxial output disc (62). Each roller is mounted to rotate about a fixed centre (66) and a fixed axis (58) within a rigid carriage (67), one end of which contacts operating mechanism reciprocable over a predetermined stroke of operating movement and operable to apply a control force to the carriage. The assembly of roller and carriage is located by only three contacts with adjacent structure, namely the two disc/roller contacts (86, 88) and the contact (82) with the operating mechanism. These three contacts suffice to cause the roller constantly to seek a ratio angle at which the instantaneous value of the control force is balanced by the instantaneous value of the traction forces to which the roller assembly is subjected due to the contact between the roller and the two discs, and at which the transmission is therefore in equilibrium.

35 Claims, 10 Drawing Sheets

TRANSMISSIONS OF THE TOROIDAL-RACE ROLLING-TRACTION TYPE

This is a continuation of application(s) Ser. No. 07/689,774, filed on May 15, 1991, now abandoned.

BACKGROUND OF THE INVENTION

This invention relates to continuously-variable-ratio transmissions (which will be referred to as CVT's) of the toroidal-race, rolling-traction type. It relates in particular to the variators, that is to say the ratio-varying units, of such transmissions in which rollers of variable orientation transmit traction between coaxial and part-toroidal input and output grooves or races, formed on coaxial and rotatable input and output discs respectively. By simultaneously altering the radius from the common axis of the discs at which the rollers make rolling contact with the two races, the relative speeds of the two discs change, resulting in a change in the transmitted ratio. While the prior art teaches and the invention will be described with relation to toruses of circular cross-section, the invention includes CVT's in which the torus is generated by rotating any closed figure, of generally circular outline, about a generator line.

Patent applications in this art, relating especially to automobile transmissions, have been filed regularly from at least the 1920's onwards. Specification U.S. Pat. No. 1,865,102 is an example of a patent granted on one such application filed in 1929. In that specification, as in many others in this art, there are two input races and two output races and a set of three rollers transmits drive from each input race to its corresponding output race, all rollers in the variator being constrained at all times to contact their respective input race at a common first radius and their respective output race at a common second radius.

It has been common practice in the art to mount each roller so that it spins about an axle mounted in a supporting member usually called a carriage, and to connect the carriages of all the rollers in one set so that those carriages move in unison when required so as to change the transmitted ratio, and between such movements to hold their associated rollers steady so that they all transmit the same ratio in the manner already described.

In the accompanying drawings, FIGS. 1 to 3 all show the same, known type of variator. They are also all simplified and generally diagrammatic, and should be studied together because certain parts shown in one of them are omitted from one or both of the others. FIG. 1 is an axial section through the variator, FIG. 2 shows the roller-supporting mechanism in a section on the line II—II in FIG. 1, and FIG. 3 is a section on the line III—III in FIG. 2. As shown in FIG. 1, an input shaft 1 is rotatable about an axis 2, is driven by a prime mover 3 and carries two input discs 4 and 5 formed with part-toroidal races 6 and 7 respectively. Disc 5 is fixed to shaft 1, while a keyed connection 8 prevents mutual rotation between the shaft and disc 4 but allows limited relative axial movement. Disc 4 acts as a piston within a cylindrical cap 9 which is fixed to shaft 1, and the chamber 10 within the cap is connected to a pressurized fluid source 11. A single output disc 13, formed on its opposite faces with part-toroidal races 14 and 15, is mounted in a bearing 16 with freedom to rotate about input shaft 1 and to make limited relative movement axially. Disc 13 constitutes the output member of the variator and a gear 17, formed on the rim of the disc, engages with the final drive of the transmission (not shown) by way of a gear 18 rotatable on a support fixed relative to the variator casing 19. Race 14 conforms to the surface of the same torus as race 6, and races 15 and 7 are similarly related. A set of three rollers 20, which are equi-spaced around axis 2 but of which only one is shown, make rolling contact with races 6 and 14 and so transmit drive from input disc 4 to output disc 13. Rollers 20 are mounted in a supporting frame 21. A second and symmetrically-arranged set of rollers 25, mounted on a supporting frame 26, transmit drive from race 7 to race 15 formed on the opposite face of output disc 13. The necessary hydraulic end load to urge the discs and rollers firmly into contact with each other by way of an intervening thin film of fluid, so that they transmit the required driving power to the final drive by way of gear 18 in a manner well known in the art, is generated by the fluid in chamber 10. As already stated, input disc 4 and output disc 13 can make slight axial movements in response to that load.

The two roller supporting frames 21 and 26 are essentially similar, and frame 21 is illustrated best in FIG. 2. It comprises a frame member 30 of generally triangular shape having a central aperture 31 to accommodate the shaft 1. Each roller 20 spins about an axis 33 on an axle 32 mounted in a carriage 34 which encompasses the roller along a line 35 passing through the roller centre 22 but leaves the two roller segments that are furthest from that line unobstructed, so that the roller can contact the races 6, 14 as already described. To change the transmitted ratio, each roller and its associated carriage 34 must be able to pivot about the same line 35 with which the carriage 34 is itself aligned, and one of the means well known in the art for inducing such pivotal movement is to impose "tangential shift"—that is to say a movement generally tangential to the centre circle of the common torus of races 6 and 14—upon the roller and carriage. In FIGS. 2 and 3, which illustrate a mechanism that is known generally in the art and is particularly similar to what is described in patent specification GB-A-1395319, both the tangential shift and the resulting pivotal movement are facilitated by mounting ball ends 37, 38 at opposite extremities of carriage 34, the two ball centres both lying on line 35. End 37 slides within a cylindrical socket 39 mounted on frame 30, while end 38 is captive within a ball-shaped socket formed in a piston 40, which slides within a cylinder 41 also mounted on frame 30. The chamber 42 of cylinder 41 is connected by way of control valve means 43 to the same pressurised fluid source 11 by which the end load chamber 10 is supplied. By using valve 43 to vary the fluid pressure within chamber 42, piston 40 imparts tangential shift to carriage 34. As already referred to, those movements will have the effect of causing the carriage and its roller 20 to tilt about line 35, and so to change the transmitted ratio.

The centre 22 of each roller 20 must at all times lie on the centre circle of the imaginary torus to whose surfaces races 6 and 14 conform, and when the ratio unit is in equilibrium—that is to say, when the transmitted ratio is constant for the time being—the spin axis 33 of each roller intersects the variator axis 2. In order that ratio-change should be brought about by a combination of components of tangential shift and rotation, as just described, a further geometrical feature is desirable and is illustrated in FIG. 3. This feature is that while the roller centre 22 lies in the central plane 50 of the imaginary torus at all times, ball end 37 lies to one side of that plane and ball end 38 to the other side, so that line 35 is inclined to plane 50 at an angle C known in the art as the castor angle. The effect of this angle may be explained as follows. If discs 4, 13 are rotating as indicated by arrows 51 and 52, the transmission of torque by rollers 20 between races 6 and 14 produces a torque reaction on each roller carriage 34, urging the associated piston 40 into its cylinder 41. For the transmission to be in equilibrium, two conditions must be fulfilled. Firstly the spin axis 33 of each roller must intersect the variator axis 2. Secondly the force exerted upon piston 40 by the fluid in cylinder 41 must be equal and opposite to the force which the torque reaction exerts upon the roller carriage, both forces being measured in a plane at right angles to the variator axis 2. If now the fluid pressure is increased in cylinder 41, driving the piston 40 downwards (as shown in FIG. 3) against the direction of the discs/roller torque reaction, equilibrium is destroyed because the cylinder and torque reaction forces are no longer in balance. The roller axis 33 will therefore no longer intersect the variator axis 2. As a result a steering force is imposed on the roller by the discs 4 and 13 so as to tilt the carriage 34 about line 35, until equilibrium is restored when the cylinder and torque reaction forces are in balance again, and when axis 33 once more intersects axis 2, the degree of tilt (which is proportional to the resulting change in transmitted ratio) being dependent upon the size of the initial tangential displacement or shift, and of the castor angle. Tangential shift in the opposite direction, which in the known variator shown in FIG. 3 will be brought about by a reduction in fluid pressure in cylinder 41, will result in the roller tilting in the opposite direction.

A fundamental feature of variators of the type just described in outline, and described in greater detail in patent specification GB-A-1395319 for example, is that they are of "force-balance" type. That is to say, one of the conditions that must be fulfilled for equilibrium of the transmission at any given ratio value is that the torque reaction force and the hydraulic force acting upon the carriage piston must be in balance. If either of these forces changes, equilibrium is lost until the forces are brought into balance once more. This feature distinguishes transmissions as shown in GB-A-1395319, and transmissions according to the present invention also, from an older generation of CVT's of the toroidal-race, rolling-traction type in which roller and carriage are positioned by mechanical means which are not themselves responsive to the torque reaction forces to which the rollers and carriages, once positioned, are themselves subjected. Patent specification U.S. Pat. No. 2,130,314 describes a mechanical positioning system of this kind, in which one end of the roller carriage is connected by a ball-and-socket joint to a control pinion. The transmitted ratio is varied by turning the pinion, so changing the orientation of the carriage by altering the location of its point of connection to the pinion. However, the carriage/pinion connection is such that the torque reaction experienced at the disc/roller interfaces through the carriage acts upon the pinion in a direction substantially parallel to its axis of rotation. No useful balance between the torque reaction force and the force applied to the pinion to turn it is therefore possible, and means other than force balance must therefore be found to ensure that the pinion always seeks the rotary position at which the roller transmits the ratio required by the instantaneous prevailing conditions.

In the known mechanism of force-balance type shown in FIGS. 2 and 3 the ball ends 37, 38 can move axially and simultaneously within their respective cylinders so that the line 35 moves, and each carriage 34 can rotate about the instantaneous position of line 35. However, because the carriage is located at both ends, it has no freedom to rotate about any other axis. FIG. 4 of the drawings of patent specification GB-A-1600972 (equivalent to U.S. Pat. No. 4,281,559) shows another variety of known mechanism in which the roller carriage (83) is fast with the head (82) of the single piston by which the position of the roller (13) is controlled. As with the two known mechanisms just described, this carriage is capable of translational movement along a line (the axis of movement of piston head 82) and of rotation about that line, but has no freedom to rotate about any other axis. It should also be noted that in the CVT shown in FIG. 4 of GB-A-1600972 the two rotors 10, 12 between which the roller 13 transmits traction must themselves be capable of simultaneous and equal movements, in a direction parallel to the main axis of the CVT, to accommodate displacements of the roller 13 by piston 82; the requirement for such movement of the rotors naturally introduces further complexity and expense for the CVT as a whole.

Another known design of CVT of the force-balance type is shown and described in patent specification U.S. Pat. No. 3,933,054, in which the traction forces experienced by each roller (40–42 in the drawings) are balanced by the hydraulic force acting on a piston (66). As to how to synchronise this balance of forces with the desired value of the transmitted ratio, the teaching of U.S. Pat. No. 3,933,054 is clear. Each roller carriage is connected by a hinged joint (pin 47) to the mechanism on which the piston (66) is mounted. The carriage also carries a cam follower (50) which engages with a cam slot (70) secured to the transmission casing. As already explained, in the description of FIGS. 1 to 3, two conditions must be fulfilled if a transmission of this type is to be in equilibrium. Therefore when the transmission of U.S. Pat. No. 3,933,054 falls out of equilibrium, two related but distinct motions must take place in order to restore It. Firstly there is a generally axial movement of each piston (66) within its cylinder (65), until a new torque reaction at the disc/roller interfaces balances a new hydraulic force exerted upon the piston by the fluid within the cylinder. Second, the angle of tilt of the roller (40–42) must change until the roller axis once more intersects the drive axis (D) of the transmission. Specification U.S. Pat. No. 3,933,054 teaches that the slot/follower (70/50) engagement is essential to achieve this second motion. In response to the first motion of the piston, the follower (50) is forced to move along the slot (70) so changing the angle of tilt of the roller (40–42) and thus the transmitted ratio. This requires both pivoting at the hinged joint (47), and rotation of the piston 66 about its axis within its cylinder (65). Now the axis of the hinged joint (47) intersects the two points of contact of the roller (41) with the disc grooves (30, 31), so without the engagement of follower (50) and slot (70) as taught by specification U.S. Pat. No. 3,933,054, the tilt angle of each roller (40–42) in response to any loss of equilibrium of the transmission, would be indeterminate. As taught by U.S. Pat. No. 3,933,054, therefore, for effective operation each assembly of carriage and roller thus requires four points of contact with adjacent mechanism, namely the contact between the roller and the two grooves between which it is transmitting traction, the contact with the hydraulic operating mechanism through the hinge (47), and the follower/slot contact.

SUMMARY OF THE INVENTION

The present invention arises from further consideration of the full range of constraints which operate upon the tilting of the rollers and the axes about which they tilt, and the resulting conclusion that the orientation of the rollers, and thus the transmitted ratio, can be achieved with a different and simpler design of roller carriages, and constraints upon them and particularly upon the number of contacts between each carriage and adjacent structure. The invention applies particularly, but not exclusively, to roller control systems in which there is a component of castor angle to the contacts between rollers and races. The invention is defined by the claims, the contents of which are to be read as part of the disclosure of this specification, and the invention will now be described, by way of example, with reference to the following further diagrammatic or schematic drawings in which:

DESCRIPTION OF THE PREFERRED EMBODIMENTS

Figure 1:
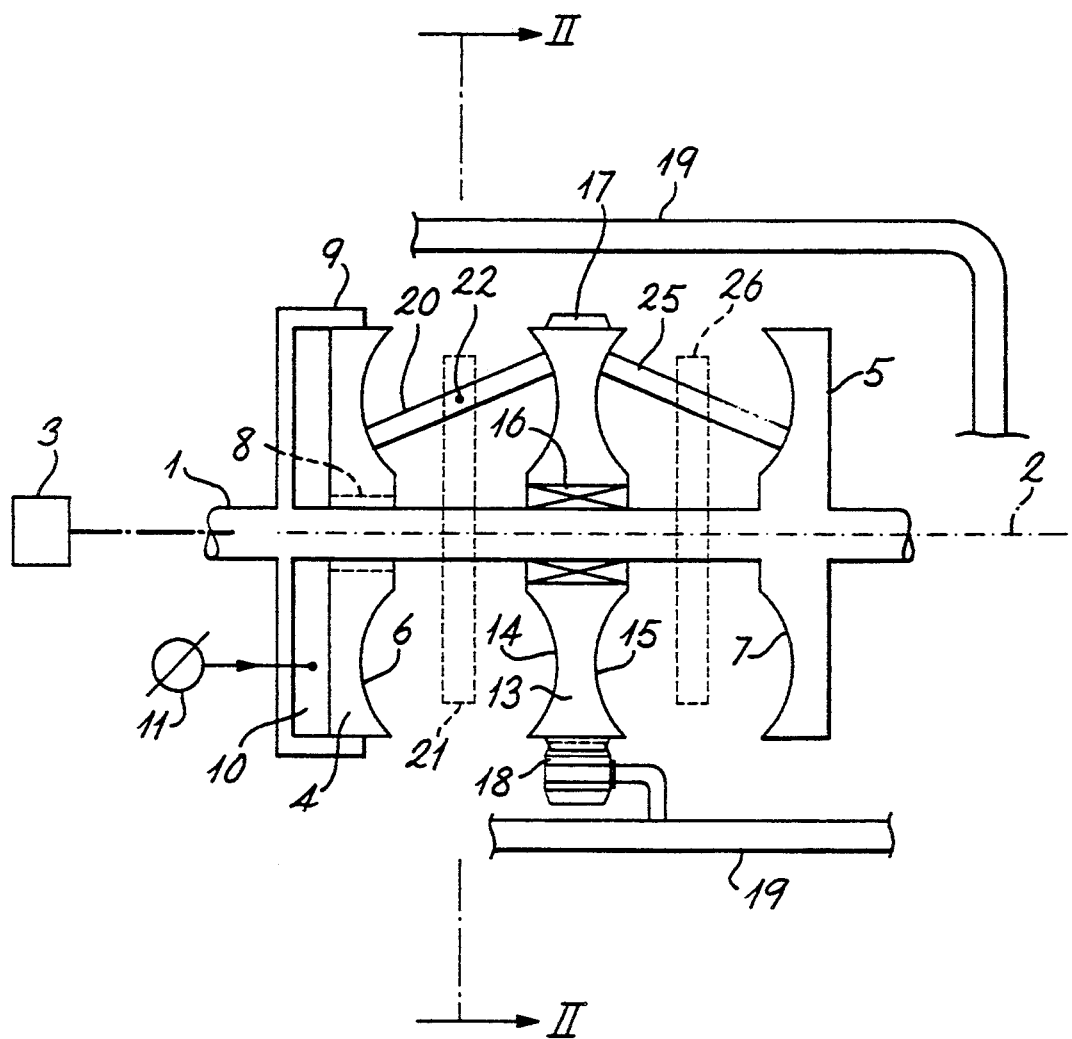
FIGS. 1, 2 and 3 show the same known type of variator.
Figure 2:
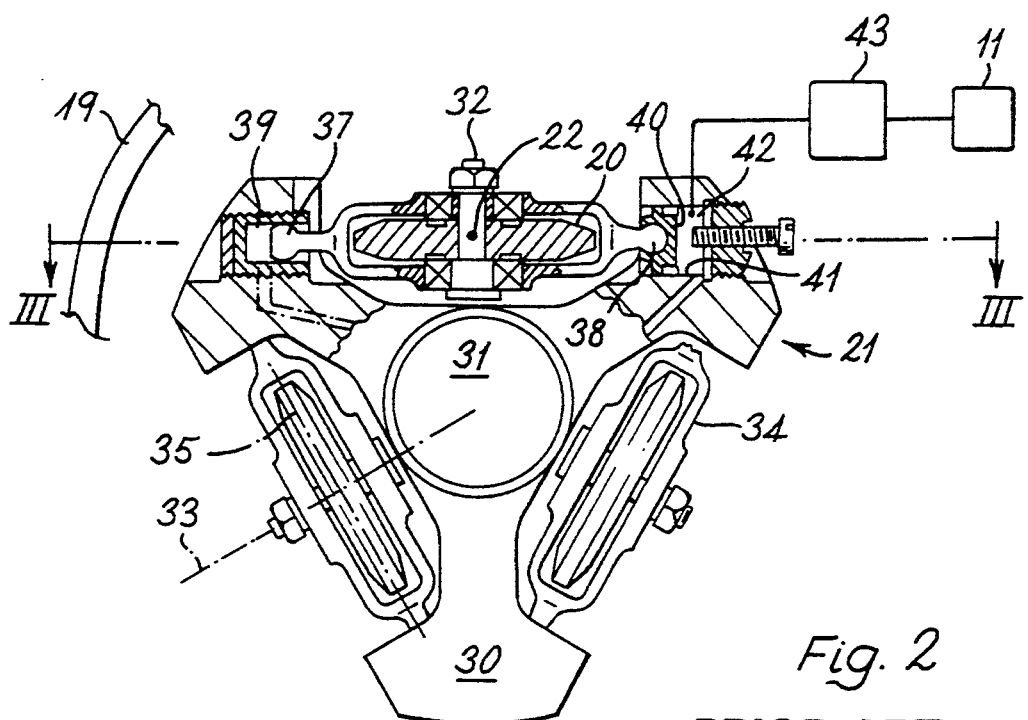
Figure 4:
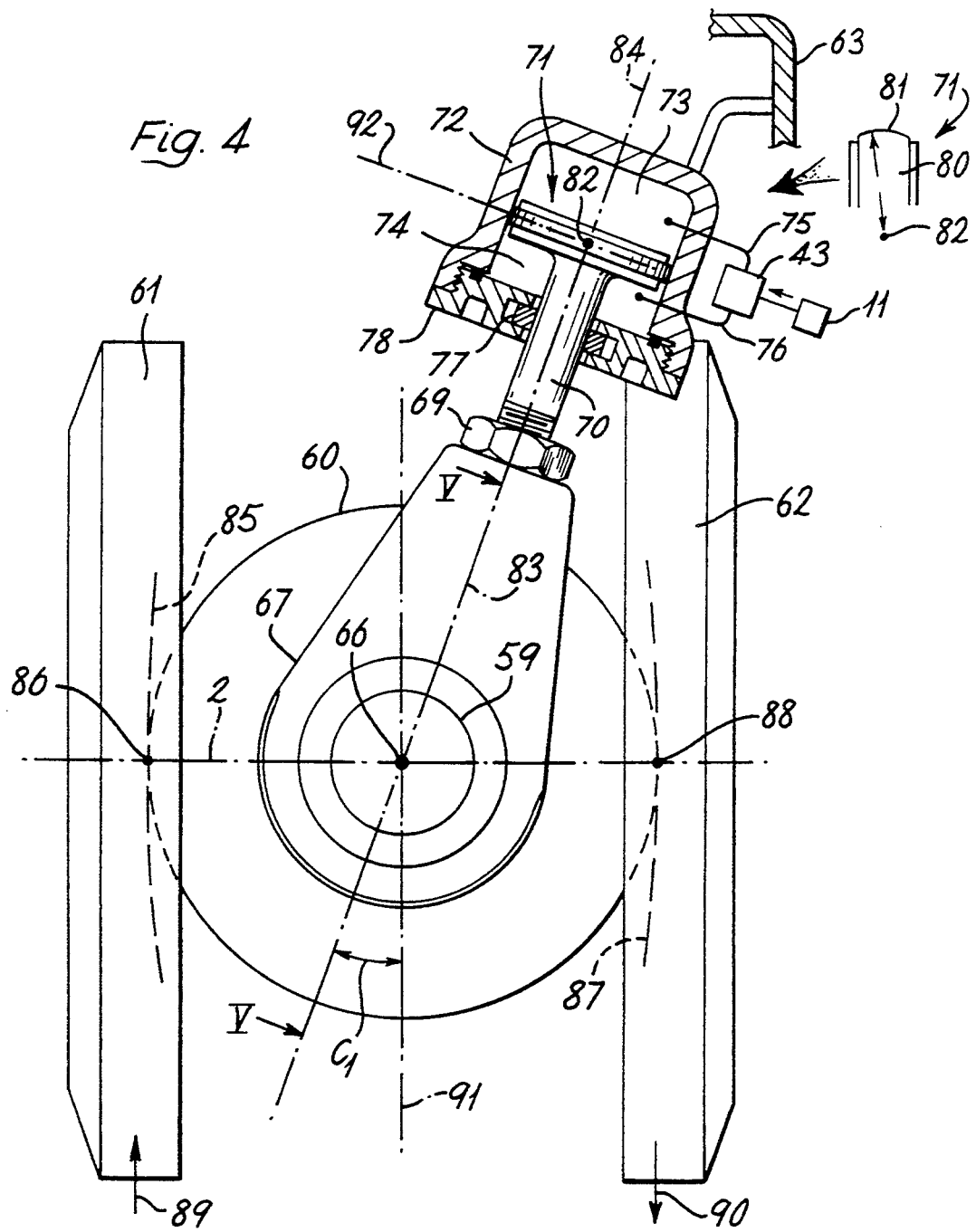
FIG. 4 is a view of one variator taken at right angles to its axis, with some parts shown in section.
Figure 5:
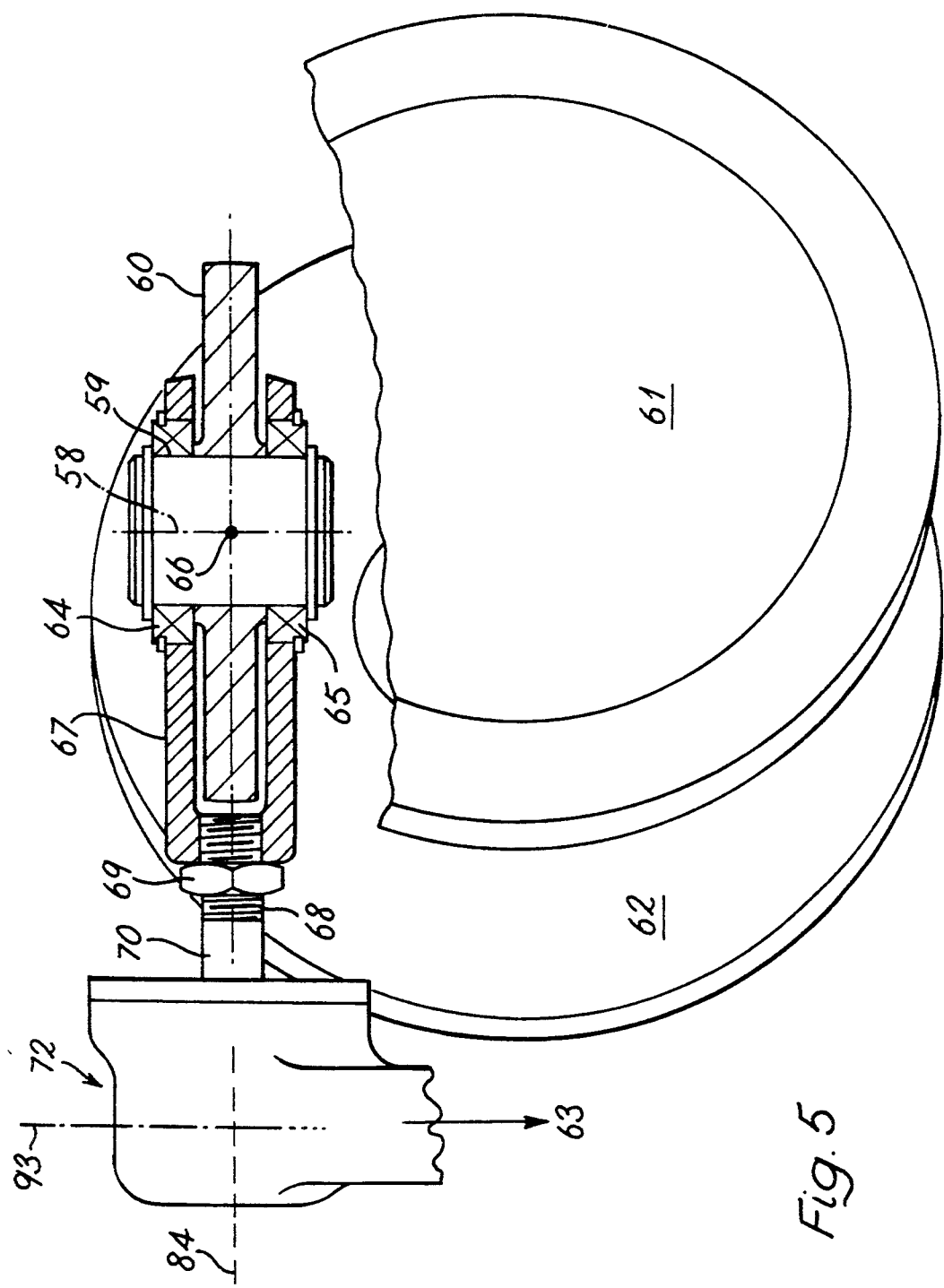
FIG. 5 shows the same variator, with some parts shown in a section taken on the line V—V in FIG. 4.

FIGS. 4 and 5 show a roller 60 transmitting drive from the input disc 61 to the output disc 62 of a toroidal-race variator housed within a casing 63. Items 61, 60, 62 and 63 correspond essentially with items 4, 20, 13 and 19 of FIG. 1. Roller 60 is mounted on an axle 59 in bearings 64, 65 to spin about an axis 58 within a carriage 67 so that both the axis 58 and the roller centre 66 are fixed relative to the carriage, which is itself secured by a threaded connection 6B and locknut 69 to one end of a shaft 70. A double-acting piston 71, mounted on the other end of that shaft, moves within a cylinder 72, and the two chambers 73 and 74 of that cylinder are connected by lines 75 and 76 to pressure fluid source 11 by way of control valve means 43, as in FIG. 2. Shaft 70 enters cylinder 72 by way of a flexible sealing gland 77 which is mounted in the cylinder end plate 78 and is capable of limited transverse movement without sealing loss. As is shown best by the magnified insert to FIG. 4, a central sealing ring 80 of piston 71 has an outer rim 81 which conforms effectively to the surface of a sphere having as its centre the point 82 which is also the centre of the piston. Piston centre 82 is thus constrained to movement along the axis 84 of cylinder 72, but because of the contouring of rim 81 and the flexible sealing gland 77 the carriage 67 is capable at all times of rotation about axis 84, and of rotation about the orthogonal axes 92 and 93.

Roller 60 contacts the toroidal race 85 of disc 61 at 86, and the corresponding race 87 of disc 62 at 88, and as shown in FIG. 4 discs 61 and 62 are rotating as indicated by arrows 89 and 90. According to the invention, we have discovered that the reaction forces active through three points of contact only, namely the two reaction forces between the discs and the roller, and the third reaction force on the piston 71, are between them sufficient to ensure that the roller seeks and holds the appropriate ratio angle at which the piston/fluid and roller/disc reactions are balanced, without any further physical constraint upon roller or carriage. This is of course to be contrasted particularly with the mechanism of U.S. Pat. No. 3,933,054 where, as already explained, four contacts with adjacent mechanism are needed for stability. It should also be noted that there is no requirement for the discs 61, 62 to be capable of simultaneous and equal movements along the CVT axis 2, as is necessary in GB-A-1600972. The nominal axial position of disc 61 within the CVT will in practice be predetermined, just like that of disc 5 of FIG. 1. The essential geometry of a toroidal-race variator requires that roller centre 66 must always lie on the centre circle of the common torus of discs 61 and 62, which in turn lies in the torus mid-plane 91. Therefore the solid angle through which line 83 (which is drawn through roller centre 66 and piston centre 82) can move must be great enough to permit roller centre and torus centre circle to coincide, whatever the position of piston 71 within cylinder 72. Furthermore, because the centre 82 of piston 71 is constrained to follow the fixed axis 84 of cylinder 72, the angle between that axis and the plane 91 therefore becomes the nominal castor angle for the variator. It will however be apparent that the actual castor angle $C_1$ (FIG. 4) lies between plane 91 and line 83, and that this angle will vary slightly in use, dependent upon the position of piston 71 within cylinder 72 and thus of where piston centre 82 lies on axis 84. It should also be noted that in the embodiment of the invention shown in FIG. 4, determination of the appropriate ratio angle, as just described, requires that the roller 60 is constrained to spin about a fixed-axis and a fixed centre 66 within carriage 67. If that centre were free to move up and down the spin axis 58, as is the case in some known carriages in this art, a further degree of freedom would exist and the necessary roller control would not be achieved. More particularly, if the spin axis 58 were able to pivot relative to the direction of the control force exerted by piston 71, in the manner permitted by the pin connection 47 in U.S. Pat. No. 3,933,054, a further degree of freedom would again exist and the necessary roller control would not be achieved.

Figure 3:
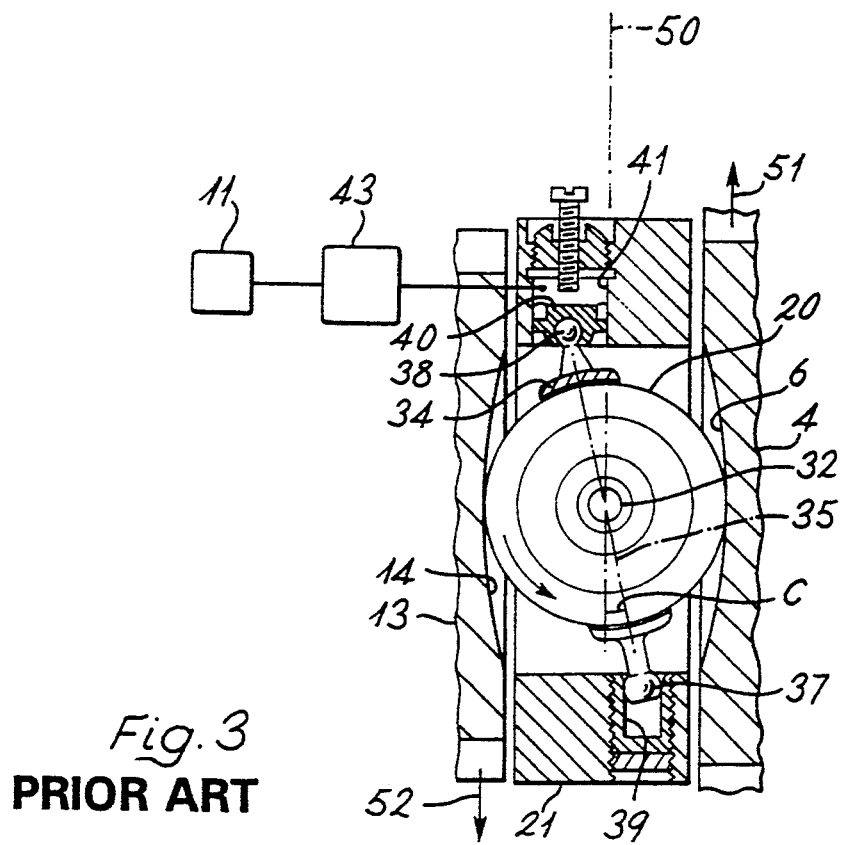

Sufficient ratio control in the embodiment of FIG. 4 is thereby achieved by connecting the roller and carriage to operating mechanism (that is to say, the double-acting piston and cylinder 71/72) where only a single point of connection (effectively the piston centre 82) is subject to axial and radial constraint, the carriage being free to move within a limited solid angle having its vertex at that point, and where the entire operating mechanism lies to one side of the roller centre 66. This offers obvious economies in components, compared with the known double-ended carriage restraint provided by ball ends 37, 38 in FIG. 2 of the present application, or trunnions 32/recesses 31 in U.S. Pat. No. 1,865,102, and the movable rotors 10, 12, of GB-A-1,600,972. Another advantage of the embodiment of the present invention shown in FIGS. 4 and 5 over prior proposals such as that shown in FIGS. 2 and 3 of the present application is that the single cylinder 72 may conveniently, as shown best in FIG. 4, be mounted not on a triangular frame such as item 30 of FIG. 2, which like the rollers and carriages must be accommodated between the input and output discs, but directly and simply on the casing 63 of the variator as a whole. This in turn helps to make possible large values of the nominal castor angle between cylinder axis 84 and plane 91, and thus of the actual castor angle $C_1$ between plane 91 and line 83. Researches indicate that working values of castor angle $C_1$ of the order of 20° or even more, which are large compared with the castor angles of say 5°-8° which have been the most frequently used in this art, may promote greater stability in general, and in particular a more prompt return to equilibrium (in which axis 58 and the variator axis 2 intersect) whenever an axial movement of piston 71 has disturbed that equilibrium so as to cause the roller and carriage to tilt about line 83 and so change the transmitted ratio.

Figure 6:
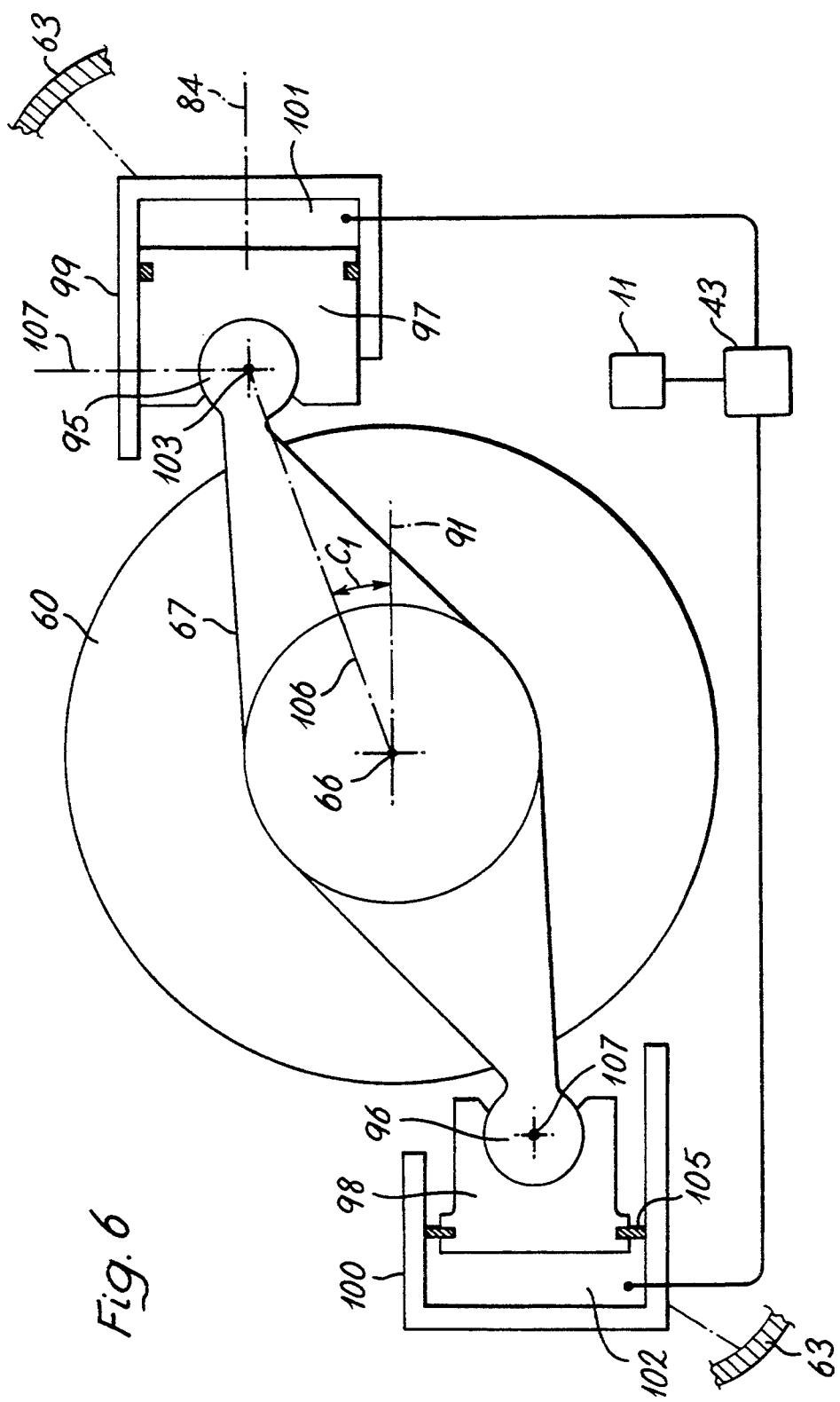
FIG. 6 is a schematic view of parts of another variator.
Figure 7:
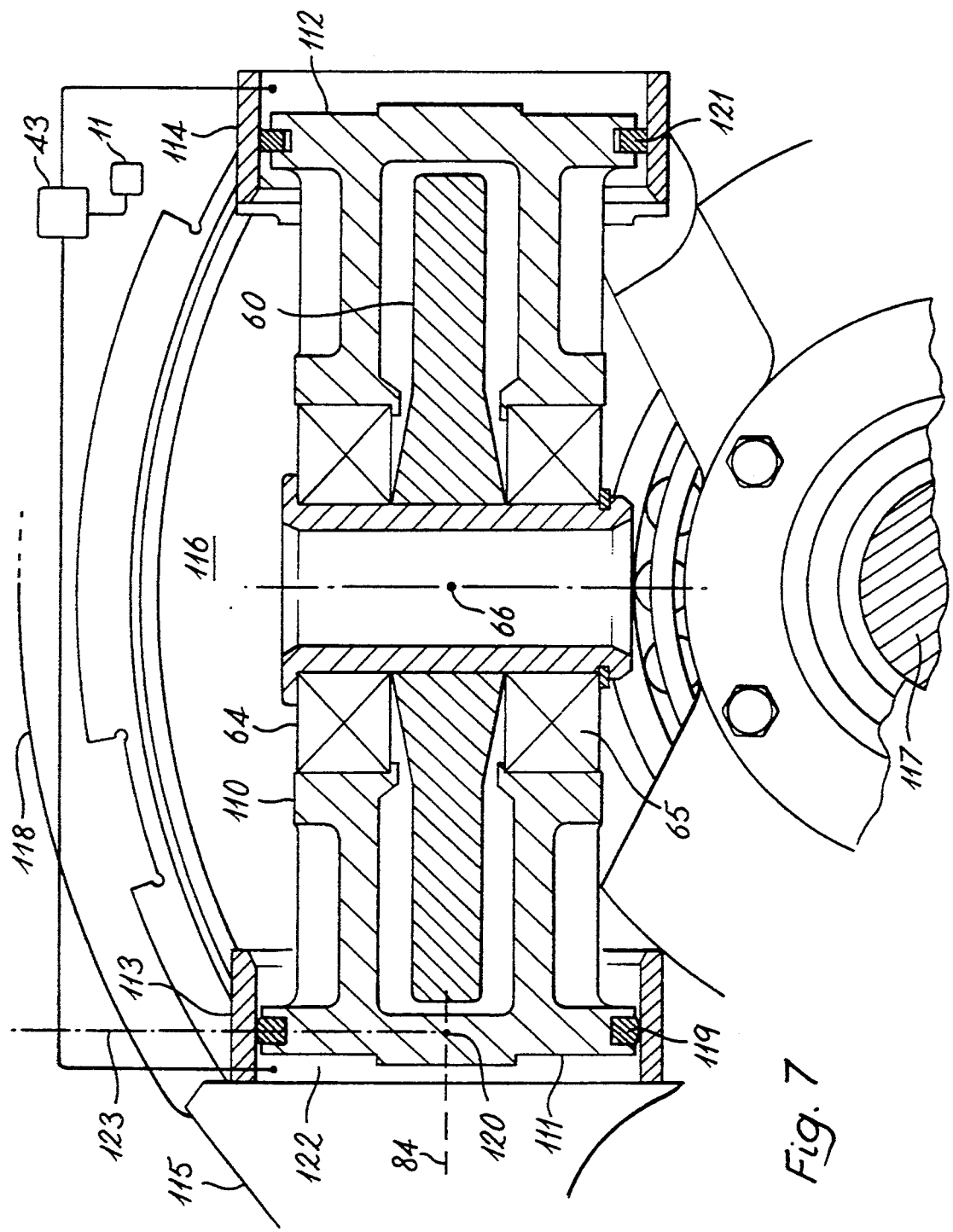
FIG. 7 shows more details of yet another variator, generally in a section taken at right angles to its axis.

In FIGS. 4 and 5 the entire operating mechanism lies to one side only of the plane which includes the CVT axis 2 and the roller centre 66. This promotes compactness of design, but double-acting piston-and-cylinder combinations like items 71, 72 in FIGS. 4 and 5 may present problems of construction and operation in certain cases, and FIGS. 6 and 7 show alternative designs according to the invention, and use the reference numerals of FIGS. 4 and 5 for all comparable items. In FIG. 6 ball members 95 and 96 are mounted on carriage 67 at opposite ends of a diameter, and engage with socket joints in pistons 97, 98 which slide in cylinders 99, 100 respectively. The chambers 101, 102 of these two cylinders are connected to pressure source 11 by way of valve means 43, just like the two chambers of cylinder 72 were in FIG. 4. Piston 97 slides accurately within cylinder 99 so that the centre 103 of ball 95 is constrained to the cylinder axis 84, but the flexible sealing ring 105 which spans the annular clearance between piston 98 and its cylinder 100 allows some freedom of movement, with the effect that the guidance of piston 98 by cylinder 100 is as if there was no solid-to-solid contact between the two parts. The only substantial effect upon carriage 67 of the forces exerted upon it by piston 98 are comparable to the pulling forces that piston 97, were it double-acting, would exert upon ball 95. In this embodiment of the invention ball centre 103 constitutes the effective point of connection between the carriage and its operating mechanism (like piston centre 82 in FIG. 4) and the line 106 joining ball centre 103 and roller centre 66 takes the place of line 83 as the line which defines the working castor angle $C_1$ with the torus mid plane 91. The joint between ball 95 and piston 97 therefore has the characteristic of constraining carriage 67 so that ball centre 103 can move along axis 84, and so that the carriage can also rotate not only about that axis, but also about axis 107 at right angles to it and about the further orthogonal axis that lies perpendicular to both 84 and 107, and thus also to the paper. Cylinders 99 and 100 could both, as shown, be mounted on the variator casing 63.

FIG. 7 shows a roller 60, mounted as before in bearings 64, 65 to spin about a fixed centre 66 within a carriage 110, but in this embodiment the carriage 110 is formed with pistons 111 and 112 at opposite ends. These pistons slide within oppositely-facing cylinders 113 and 114 mounted in a frame 115 (comparable to item 30 of FIG. 2) located between an input disc 116 and output disc (not shown) of the variator. References 117 and 118 represent the input shaft and variator casing respectively, frame member 115 being fixed to the latter. Ring 119 of piston 111 is shaped like item 80 of piston 71 in FIG. 4, so that the centre 120 of the piston has the same function has centre 82 of piston 71, and is constrained to follow the cylinder axis 84. The substantial annular clearance between piston 112 and its cylinder 114 is spanned by a flexible ring 121 comparable to ring 105 of FIG. 6, and also as in that Figure the cylinder chambers 101,102 are connected by way of control valve means 43 to pressure source 11. The effect of piston 112 upon carriage 110 is thus comparable to that of piston 98 in FIG. 6, contributing negligible radial constraint and effectively only exerting such force upon the carriage as piston 111, were it double-acting, would do when it pulled. Piston centre 120 therefore constitutes the effective point of connection between the carriage and its operating mechanism, like items 82 and 103 of FIGS. 4 and 6, and is constrained to move along axis 84 but also permits the carriage 110 to rotate not only about axis 84, but also about orthogonal axis 123 and about a third axis which passes through centre 120 and lies at right angles to both 84 and 123 and therefore also to the paper. In this embodiment of the invention, as in FIG. 4, the "nominal" castor angle of the variator will be set by the axis 84 of cylinder 113, but the actual and slightly variable castor angle will in use be that angle, as in FIG. 4, at which the line joining roller centre 66 and piston centre 120 intersects the mid-torus plane (not shown, but comparable to item 91 of FIGS. 4 and 6). As with carriage 67 of FIG. 4, carriage 110 is able to move through a limited solid angle about a point constrained to move along axis 84, the angle being sufficient not only to allow the roller 60 to progress through the full range of ratio angles required of the variator, but also of course to permit the roller centre 66 to lie on the torus centre circle (its only geometrically possible position) at all times, whatever the position of piston 111 within its cylinder 113.

Figure 8:
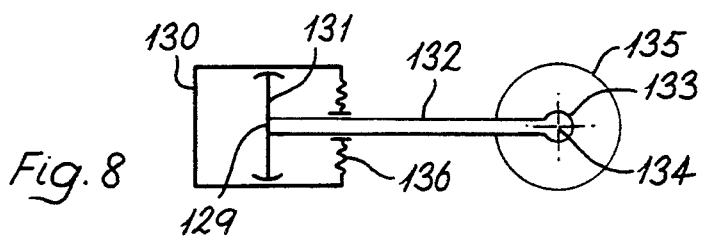
FIGS. 8 to 17 are schematic illustrations of ten different roller control systems according to the invention.

While the invention is defined formally by the claims, less formally stated the invention seeks to provide a roller control system which is considerably simplified compared with many known systems, in which the operating mechanism imposes a translational movement upon the roller carriage which determines the location of the roller centre on a circular locus running centrally around the torus, and in which the carriage has sufficient degrees of rotary freedom that nothing constrains the roller centre from following that locus so as to take up the position demanded of it by the operating mechanism at all times. Where the torus is of circular cross-section, as shown in all the Figures, that locus will be the torus centre circle. FIGS. 8 to 17 illustrate, in outline, only a selection of the types of roller control system that fall within the scope of the present invention. In FIG. 8 the piston 131 can both move axially and rotate like a ball within cylinder 130, and is attached rigidly to shaft 132 which is in turn attached rigidly to roller carriage 133. Shaft 132 and carriage 133 can equally well be regarded as together constituting a single, one-piece carriage assembly. Both the centre 134 and the axis of the rotation of roller 135 are fixed relative to the carriage, and the front wall 136 of cylinder 130 can flex to accommodate deflection of rod 132. Cylinder 130 is double-acting, and will In practice be fixed within the transmission. It will be appreciated that the embodiment of the invention, already described in some detail with reference to FIGS. 4 and 5, is of this type.

Figure 9:
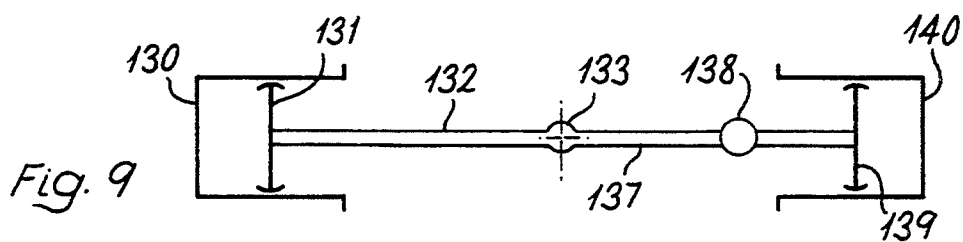

In FIG. 9, as in FIG. 8, piston 131 can rotate as a ball within cylinder 130 and is rigidly attached to roil 132, but now cylinder 130 is only single-acting, and an extension 137 of the rod on the distal side of carriage 133 is connected by a ball joint 13B to a further ball-type piston 139 moving in a single-acting cylinder 140. Piston 139 and cylinder 140 provide the system with the reverse movement that cylinder 130 would provide, were it double-acting as in FIG. 8. FIG. 9 thus shows a variant of the single-acting systems already described in more detail with reference to FIGS. 6 and 7.

Figure 10:
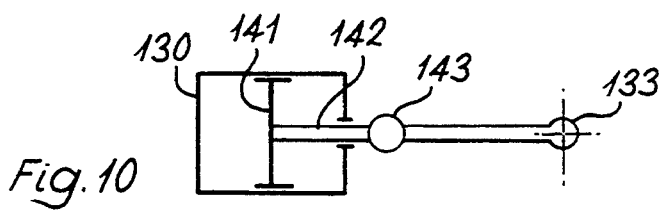

In FIG. 10 cylinder 130 is double-acting again and a piston 141, capable only of translation along and rotation about the cylinder axis, is attached rigidly to a rod 142. The other end of this rod is attached, by way of a ball joint 143, to the carriage 133.

Figure 11:
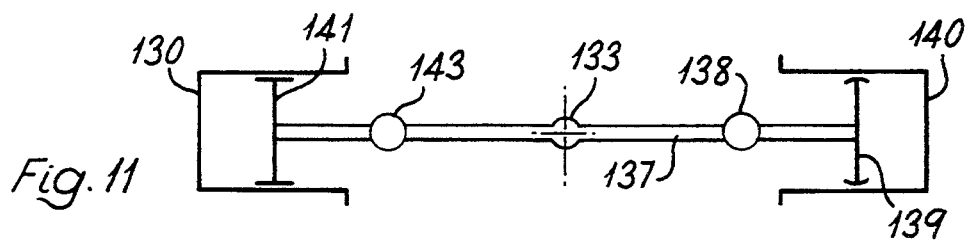

FIG. 11 is similar to FIG. 10, except that cylinder 130 is now only single-acting. The system is therefore extended by items 137–140, as in FIG. 9, to provide the facility for reverse motion.

Figure 12:
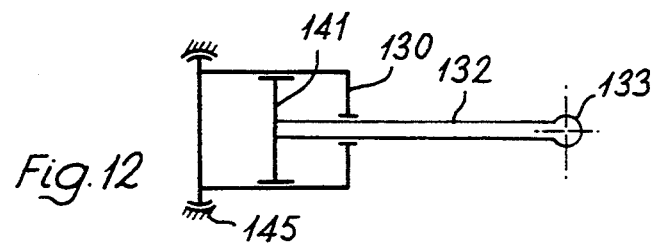
Figure 13:
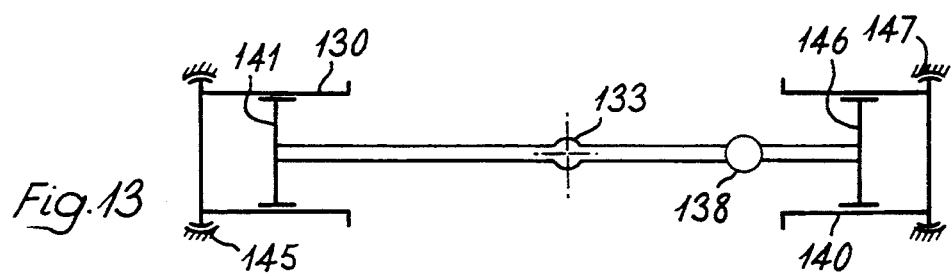

FIG. 12 shows a variation on both FIG. 8 and FIG. 10. Cylinder 130 is double-acting as in both of those Figures, piston 141 is as in FIG. 10 and its rigid connection 132 with carriage 133 is as in FIG. 8. To provide the extra degrees of rotary freedom necessary to the invention, therefore, cylinder 130 is itself mounted to rotate as a ball within a fixed and complementary ball-shaped housing 145. FIG. 13, which includes a further piston 146 comparable to item 141 and movable in a cylinder 140 which can rotate like a ball within a housing 147 comparable to 145, represents the corresponding variation of the design of FIG. 9.

Figure 14:
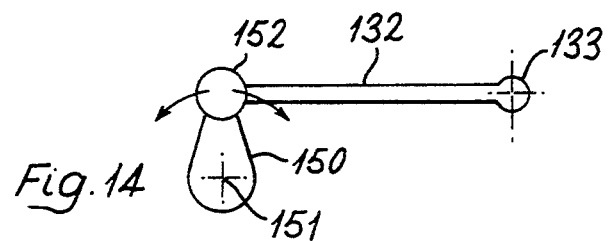
Figure 15:
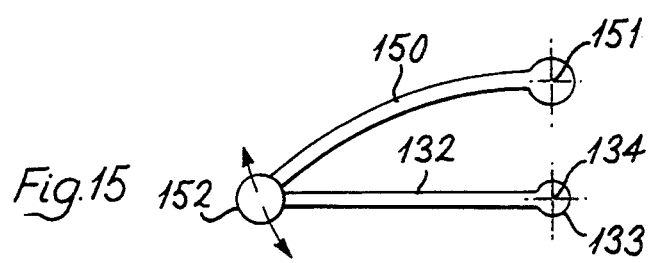

The system shown in FIG. 14 is comparable to that of FIG. 10, but the operating mechanism, instead of being in the form of a conventional piston movable within a cylinder, is now an arm 150 rotatable about a fixed centre 151 and attached by a ball joint 152 to rod 132 to which carriage 133 is rigidly fixed as before. FIG. 15 is similar, the only difference being the relative positions of roller centre 134 and arm rotation centre 151, and the different shape that the arm 150 must in consequence take.

Figure 16:
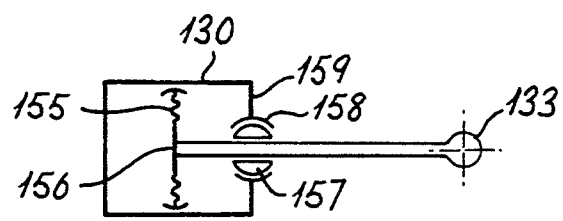

The system shown in FIG. 16 represents yet another variation of that of FIG. 8. Cylinder 130 is again double-acting, and carriage 133 is rigidly attached to piston rod 132 as before. However the piston 155 is now flexible, so that whereas the centre 129 (FIG. B) of piston 131 was constrained to follow the axis of cylinder 130, the centre 156 of piston 155 is not. The necessary further constraint upon the system is caused by rod 132 sliding through a matching and sealing cavity in a ball 157 which can rotate without loss of fluid within a matching ball-shaped housing 15B formed in the front wall 15g of cylinder 130.

Figure 17:
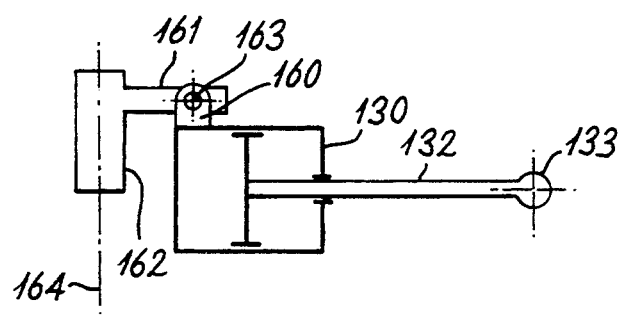
Figure 18:
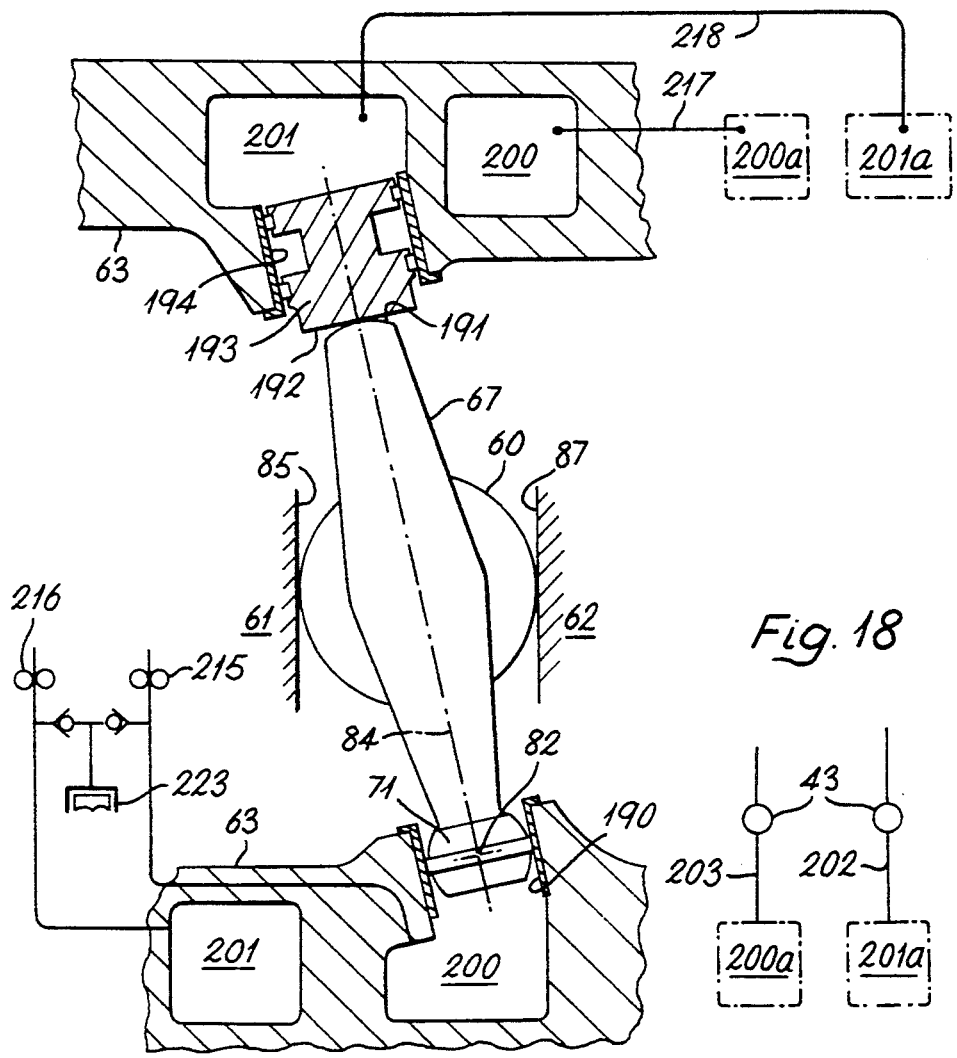
FIG. 18 shows the roller, carriage and operating mechanism of another variator, partly in elevation and partly to section.

The system shown in FIG. 17 is a variant of that shown in FIG. 12. However, whereas in FIG. 12 the necessary degrees of rotary freedom were provided by allowing cylinder 130 to rotate bodily, as a ball, within housing 145, in the variant of FIG. 17 the necessary two rotary movements are separated. A lug 160 is fixed to cylinder 130, and there is a rotary joint between this lug and a second lug 161 attached to a sleeve 162, this rotary joint allowing mutual rotation about an axis 163. Sleeve 162 can itself rotate about a further, and fixed, axis 164. Axes 163 and 164 are mutually at right angles, but do not intersect.

The embodiments shown in outline in FIGS. 8 to 17 of the drawings share certain common features. Firstly there are means capable of effecting the translational movement of the roller centre back and forth along the torus centre circle: this is provided by the rotary movement of the ends of the arms 150 in FIGS. 14 and 15, and by the strokes of the pistons 131,141 and 155 in the rest of FIGS. 8 to 17. Secondly, there is freedom for the roller to rotate about a diameter and so to change the transmitted ratio. In FIGS. 14 and 15 this rotary freedom is provided entirely by the ball joints 152, in FIGS. 10 and 11 it is provided jointly by the ball joint 143 and by the ability of piston 141 to rotate about the axis of cylinder 130, and in the rest of this group of Figures it is provided by the ability of all of pistons 131,141 and 155 to rotate about the axes of their respective cylinders 130. Thirdly, both the axis and the centre 134 of rotation of roller 135 are fixed relative to the rigid carriage 133.

Fourthly, the position of the roller centre, which is constrained to follow the torus centre circle, imposes no loads on the carriage nor on its operating mechanism. This position may be affected by dimensional variations in manufacture or assembly: in the plane of the torus centre circle the roller centre will follow the curve of the torus centre circle, while the torus centre circle itself will move in the direction of the transmission axis under the influence of end-load changes. Avoidance of such loads is achieved by designing the carriage and its operating mechanism to give the roller centre freedom to move through two intersecting arcs which lie in different and intersecting planes. This mechanism will also accommodate the small changes in castor angle which occur in use in the embodiments of FIGS. 8, 9, 12, 13, 16 and 17.

Fifth, in all the embodiments of the invention there is a constant and triangular relationship between the two points at which the roller reacts tangentially with the discs, and the location at which the control force is applied to the roller assembly. In all of FIGS. 8 to 17, the control force acts along rod 132, and is applied to that rod at a location displaced from the roller axis. The two roller/disc contacts are fixed relative to that rod, but are displaced from it and from each other. A stable triangle of forces, acting in the same plane, is therefore established. This stable triangle would still exist even if the centre and axis of the roller were displaced from, but still fixed relative to, the axis of rod 132, because the geometry of the resolution of the control force and of the two tangential roller/disc reaction forces relative to the triangle would still be constant.

In the embodiment of FIG. 1B, a roller 60 transmits traction between the part-toroidal race 85 of an input disc 61 and the corresponding part-toroidal race 87 of an output disc 62, and is mounted in a carriage 67, fixed rigidly at,one end (as in FIG. 4) to a piston 71, the centre 82 of which is constrained to follow the axis 84 of the cylinder 190 in which it moves. The opposite end of carriage 67 is formed as a spherical face 191 which in use abuts the flat working face 192 of a separate piston 193 moveable within a cylinder 194. Carriage 67 and piston 193 are thus not only separate, but also without any interlock in use, and are therefore unlike the designs shown in FIG. 6, where there is a ball-in-socket joint between carriage 67 and piston 98 and in FIGS. 9, 11 and 13 where carriage 133 is also fixed to pistons 139 or 146. The construction of FIG. 1B has the advantage that roller 60 can be put in place between discs 61 and 62 by the following succession of simple steps:

1. With fluid power disconnected, depress piston 193 within cylinder 194;
2. Insert piston 71 into cylinder 190, and introduce roller 60 between discs 61 and 62 until the crown of face 191 is substantially aligned with the axis of piston 193;
3. Release piston 193. Then, when the CVT starts to operate, and input disc 61 rotates and pistons 71 and 193 are exposed to fluid pressure, roller 60 will take up the correct orientation and working face 192 will abut spherical face 191 to exert the restoring force which single-acting piston 71 itself cannot exert.

Furthermore, the inner ends of cylinders 190, 194 are not closed, but the full bores of these cylinders are in communication with annular galleries 200, 201 formed within the casing 63 of the CVT. Galleries 200, 201 are each in communication with fluid source 11 and associated with control valve means 43, as indicated schematically in FIGS. 4 and 6, and also communicate with return lines 202 and 203 as customary. If carriage 67 makes a sudden axial movement in use due to some emergency such as a crash stop or a change in road surface from normal to icy for example, the large cross-section of the access between the galleries 200, 201 and the cylinders facilitates a speedy entry of fluid into cylinder 190 and exit of fluid from cylinder 194, or vice versa. Such a rapid entry or exit fluid could be impossible, and give rise to undesirable back pressures, if the cylinders were blind-ended, and connected to the pressure fluid circuit by way only of the normal small-bore inlet and outlet ports.

Where a set of rollers (such as items 20, FIG. 1) transmit torque between the same input and output disc, the same galleries 200, 201 may conveniently communicate with the corresponding pistons 71,193 of all rollers in the set. Where there are two sets of rollers (like items 20, 25 in the same Figure) used together in a double-ended CVT, galleries 200, 201 may communicate with the pistons of one set and galleries 200a and 201a also formed within casing 63 may communicate with the pistons of the other set. Galleries 200, 200a are connected by a conduit 217 so that the pressures existing within them are equal, and galleries 201,201a are connected to like effect by a conduit 218.

Figure 19:
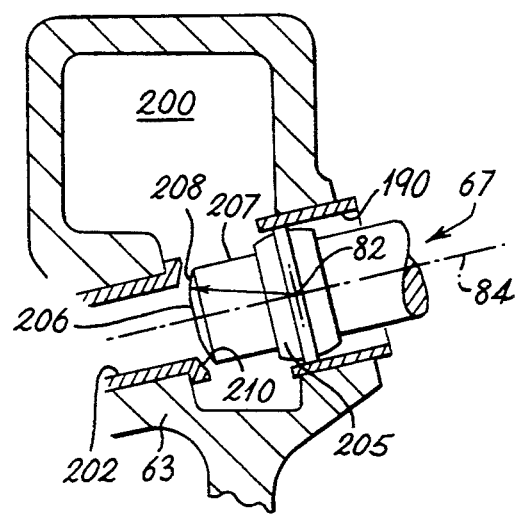
FIG. 19 shows the piston of another operating mechanism.
Figure 20:
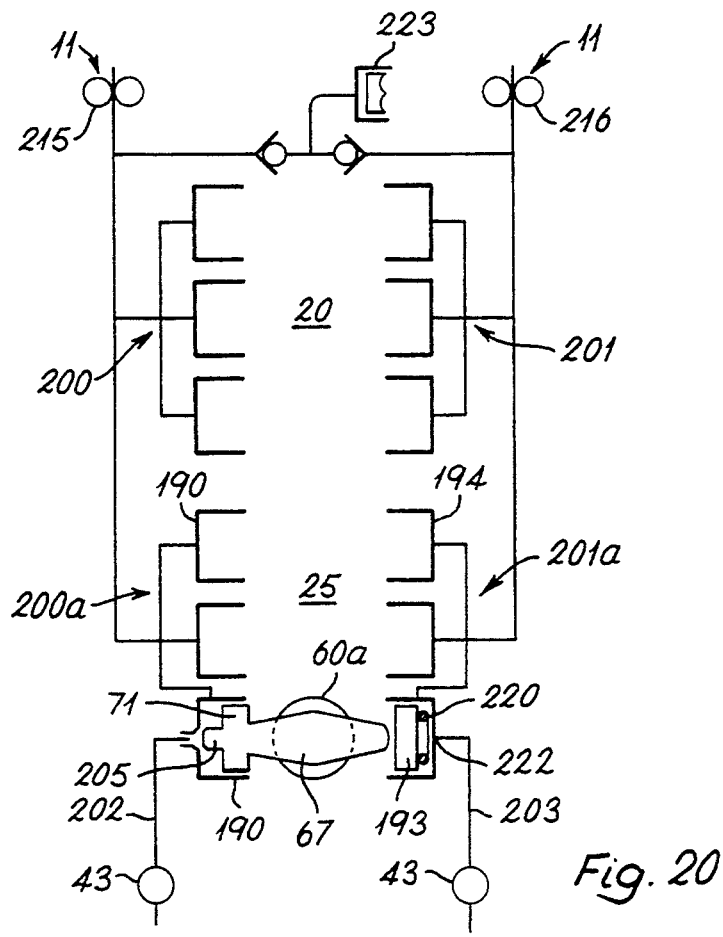
FIG. 20 shows a hydraulic circuit for use in connection with the operating mechanism of FIG. 19.

Piston 71, moving within cylinder 190 in FIG. 19 of the drawings, is modified by an extension 205, the end face 206 of which meets the side wall 207 at a smoothly curved edge 208. The edge of return line 202, where it enters gallery 200, is formed with an angled face at 210. If in use of the CVT an overload/abuse condition develops and is reflected in an extreme axial movement (leftwards, as in FIG. 19) of piston 71, surfaces 208 and 210 will approach, so imposing an extra resistance on the normal flow of fluid out of gallery 200 into return line 202. Pressure in galleries 200 and 200a will therefore rise, and since the pressure in those galleries operates on all the other pistons 71, all those other pistons will be subjected to an enhanced force which opposes them as they approach the corresponding extremes of their ranges of axial movement. A "hydraulic end stop" effect is therefore set up. FIG. 20 diagrammatically shows one possible practical embodiment in which the fluid source 11 comprises twin pumps 215, 216 connected to the galleries 200, 200a, 201, 201a feeding the operating cylinders 190, 194 of the two sets of cylinders (20, 25) of a double-ended CVT of the toroidal-race, rolling-traction type. The return lines 202, 203 of the hydraulic circuit connect with the cylinders of only one roller (60a), which acts as the "master" for all the other rollers. Piston 71 of the carriage 67 of this roller carries an extension 205, which exercises an "end stop" action as already described when piston 71 tends to overshoot within cylinder 190, and piston 193 of that same roller carries a seal 220 which exercises a similar end stop effect, by approaching cylinder end wall 221 and obstructing outlet port 222, when that piston tends to overshoot within cylinder 194. It should also be noted that the end load cylinders 223, which generates the end load force urging discs 61, 62 into contact with rollers 60, is connected to a part of the hydraulic circuit which is close to the galleries and to the roller operating mechanisms, with no substantial resistance intervening, so that equal pressures exist in the galleries and cylinder 223 at all times.

Figure 21:
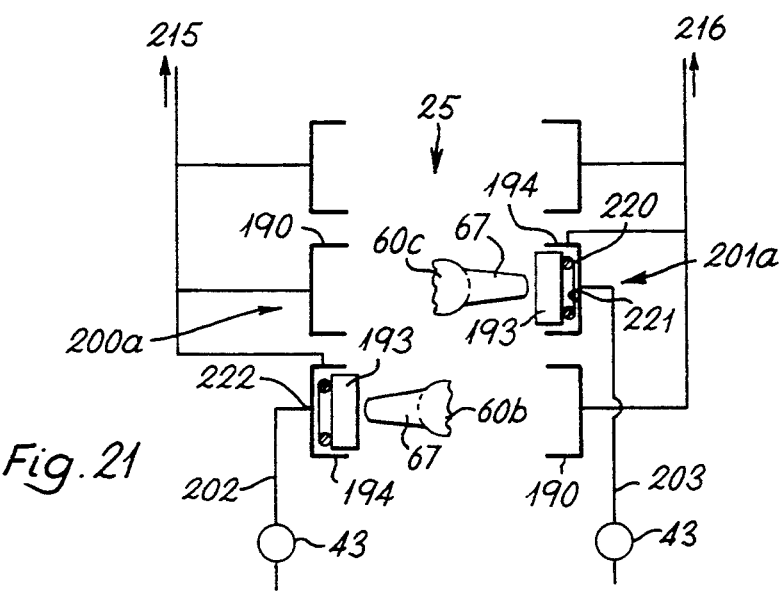
FIG. 21 shows part of an alternative hydraulic circuit.

Generating the end stop effect by means of the principal piston (71) of the roller Operating mechanism may require accurate machining of the edge 208, which must conform to part of the surface of a sphere with centre 82. FIG. 21 shows part of an alternative design in which the simpler "second piston" 193 of one roller (60b) generates the end stop effect in the left-hand side of the hydraulic circuit when that piston tends to overshoot. The adjacent roller 60c is arranged the other way round so that its "second" piston 193 is on the right-hand side of the circuit (corresponding to galleries 201, 201a), and generates the end stop effect on that side of the circuit when it overshoots.

We claim:

1. A CVT of the toroidal race, rolling traction type in which a roller assembly comprises a carriage (67), bearings (64, 65) mounted on the carriage and a roller (60) defining a roller centre (66) and supported by the bearings, for rotation about a roller axis (58), in which the roller contacts and transmits traction forces between coaxial rotatable discs (61, 62), presenting input and output races (85, 87) conforming to different parts of the surface of a single torus and is subjected to traction forces at the disc/roller contacts (86, 88), and a double-acting operating mechanism having a fixed part (72) and a movable part (71), the movable part being reciprocal over a predetermined stroke of operating movement and operable to apply a control force to the carriage, and in which the operating mechanism and carriage seek an equilibrium position in which the resultant of the control force and of the traction forces experienced by the roller assembly is zero, wherein:

the single torus defines a mid-plane;

the carriage includes a rigid structure relative to which the roller axis (58) and the roller centre (66) are fixed;

the operating mechanism includes constraint means defining a single point (82) of constraint which constrains the operating mechanism to the application of the control force along a force application axis (83) passing through the constraint point (82) and the roller centre (66);

the constraint point (82) and the disc/roller contacts (86, 88) form a constant triangular relationship;

the equilibrium position of the roller assembly is determined by only the two disc/roller contacts (86, 88) and the position of the constraint point (82); and the roller (60) is free to rotate about the force application axis.

2. A CVT according to claim 1 wherein the operating mechanism allows the roller centre freedom to move through an arc about the constraint point (82).

3. A CVT according to claim 2 wherein the operating mechanism allows the roller centre freedom to move through two intersecting arcs, about the constraint point (82), which lie in different and intersecting planes.

4. A CVT according to claim 3 wherein the constraint point (82) defines a centre of contact between the movable part (71) and the fixed part (72).

5. A CVT according to claim 1 comprising a casing (63), the fixed part (72) being mounted on the casing (63).

6. A CVT according to claim 1 wherein the rigid structure of the carriage extends from the bearings (64, 65), in which the roller (60) rotates, to the constraint point (82).

7. A CVT according to claim 3, wherein the constraint point (82) is defined by a ball joint (95) permitting mutual rotation about orthogonal axes.

8. A CVT according to claim 1 wherein the operating mechanism includes a piston moveable within a cylinder, the piston forming part of the movable part and the cylinder forming part of the fixed part.

9. A CVT according to claim 8 wherein the piston and cylinder combination (97, 99) defines the constraint point, is single-acting and is capable of exerting a force in a first direction along the force application axis (83) through the constraint point, and the operating mechanism further includes a second piston and cylinder combination (98, 100) capable of exerting a force in a second and substantially opposite direction along the force application axis (83) through the constraint point.

10. A CVT according to claim 8 wherein the piston defines the constraint point.

11. A CVT according to claim 7 wherein the operating mechanism includes a piston moveable within a cylinder, the piston forming part of the movable part and the cylinder forming part of the fixed part, and the piston is rotatably mounted in said cylinder, the rotation between the piston and the cylinder takes place about the cylinder axis only, and the constraint point is defined by the ball joint permitting rotation about the orthogonal axes.

12. A CVT according to claim 7 wherein the operating mechanism includes a piston movable within a cylinder, the piston forming part of the movable part and the cylinder forming part of the fixed part, the piston (71, 111) having a part spherical outer surface (119) in sliding contact with the cylinder (72, 113) such that the piston forms the ball joint and is rotatably mounted in said cylinder, the rotation between the piston and the cylinder takes place about the cylinder axis and about the orthogonal axes, thereby defining the constraint point.

13. A CVT according to claim 1 in which the moveable part of the operating mechanism is located to one side only of the plane which includes the CVT axis (2) and the roller centre.

14. A CVT according to claim 1 wherein the force application axis about which the roller rotates as transmitted ratio of the CVT changes, is inclined to the mid-plane of the torus.

15. A CVT according to claim 1 including a hydraulic piston-and-cylinder combination (71, 190), by which the control force is applied to the carriage, and a port formed in the cylinder by which the cylinder is in communication with a hydraulic circuit (200), wherein the cross-section of the port is substantially coincident with and equal to that of the bore of the cylinder itself.

16. A CVT according to claim 15 defining a main CVT axis (2), and comprising a CVT casing, wherein the hydraulic circuit includes a passage (200, 201) of ring-like shape formed within the CVT casing, the ring-like shape being coaxial with the main CVT axis.

17. A CVT according to claim 9 wherein the second piston and the carriage are separate items which abut each other in use in a non-interlocking manner.

18. A CVT according to claim 1 wherein the operating mechanism includes a hydraulic operating circuit and at least one piston-and-cylinder combination, the piston having a permitted stroke, and the cylinder is in communication with that circuit via an outlet port (202), and the communication between cylinder and circuit is such that approach of the piston towards an end of its permitted stroke obstructs the outlet port causing fluid pressure to build up in the cylinder thereby opposing further piston overshoot indicating undesirable conditions of the system.

19. A CVT of the toroidal race, rolling traction type in which a roller assembly comprises a carriage (67), bearings (64, 65) mounted thereon and a roller (60) defining a roller centre (66) and supported by the bearings for rotation about a roller axis (58), in which the roller contacts and transmits traction forces between coaxial rotatable discs (61, 62) presenting input and output races (85, 87) conforming to different parts of the surface of a single torus and in so doing are subjected to traction forces at the disc/roller contacts (86, 88), and an operating mechanism having a fixed part (72) and a movable part (71), the movable part being reciprocal over a stroke of operating movement and operable to apply a control force to the carriage, and in which the operating mechanism and carriage seek an equilibrium position in which the resultant of the control force and of the traction forces experienced by the roller assembly is zero, wherein the single torus defines a mid-plane;

the carriage includes a rigid structure relative to which the roller axis (58) and the roller centre (66) are fixed;

the operating mechanism includes constraint means defining a single point (82) of constraint which constrains the operating mechanism to the application of the control force along a force application axis (83) passing through the constraint point (82) and the roller centre (66);

the constraint point (82) and the disc/roller contacts (86, 88) form a triangular relationship;

the operating mechanism allows the roller centre (66) freedom to move along two intersecting arcs, about the constraint point (82), which lie in different and intersecting planes the equilibrium position of the roller assembly is determined by only the two disc/roller contacts (86, 88) and the position of the constraint point (82); and the roller (60) is free to rotate about the force application axis.

20. A CVT according to claim 19 wherein the constraint point (82) defines a centre of contact between the movable part (71) and the fixed part (72).

21. A CVT according to claim 19 comprising a casing (63), the fixed part (72) is mounted on the casing (63).

22. A CVT according to claim 19, wherein the constraint point is defined by a ball joint permitting mutual rotation about two orthogonal axes.

23. A CVT according to claim 22 wherein the operating mechanism includes a piston moveable within a cylinder, the piston forming part of the movable part and the cylinder forming part of the fixed part, and the piston is rotatably mounted in said cylinder, the rotation between the piston and the cylinder takes place about the cylinder axis only, and the constraint point is defined by the ball joint permitting rotation about the orthogonal axes.

24. A CVT according to claim 21 wherein the operating mechanism includes a piston movable within a cylinder, the piston forming part of the movable part and the cylinder forming part of the fixed part, the piston (71, 111) having a part spherical outer surface (119) in sliding contact with the cylinder (72, 113) such that the piston forms the ball joint and is rotatably mounted in said cylinder, the rotation between the piston and the cylinder takes place about the cylinder axis and about orthogonal axes, thereby defining the constraint point.

25. A CVT according to claim 19 characterised in that the diameter of the roller (60), about which the roller rotates as transmitted ratio of the CVT changes, is inclined to the mid-plane of the torus.

26. A CVT according to claim 19 wherein a piston-and-cylinder combination (71, 190), applies the control force to the carriage, and a port formed in the cylinder by which the cylinder is in communication with a hydraulic circuit (200), wherein the cross-section of the port coincides with substantially that of the bore of the cylinder itself.

27. A CVT according to claim 26 defining a main CVT axis (21) and comprising a CVT casing, wherein the hydraulic circuit includes a passage (200, 201) of ring-like shape formed within the CVT casing, the ring like shape being coaxial with the main CVT axis.

28. A CVT according to claim 19 wherein the operating mechanism includes a hydraulic operating circuit and at least one piston-and-cylinder combination, the piston having a permitted stroke, and the cylinder is in communication with that circuit via an outlet port (20), and the communication between cylinder and circuit is such that approach of the piston towards an end of its permitted stroke obstructs the outlet port causing fluid pressure to build up in the cylinder thereby opposing further piston overshoot and indicating undesirable conditions of the system.

29. A CVT according to claim 19, wherein the operating mechanism comprises a piston movable within a cylinder wherein the cylinder forms part of the fixed part of the operating system and the piston forms part of the moving part.

30. A CVT according to claim 29, wherein the piston/cylinder combination is a double acting piston/cylinder combination and the piston is arranged to one side of the mid-plane of the torus.

31. A CVT according to claim 19, wherein the piston/cylinder combination comprises two opposed single acting piston/cylinders, wherein one of said cylinders forms part of the fixed part of the operating system and the pistons form part of the movable part both acting through the constraint point.

32. A CVT of the toroidal race rolling traction type in which a roller assembly comprises a carriage (67), bearings (64, 65) mounted on the carriage and a roller (60) defining a roller centre (66) supported by the bearings, for rotation about a roller axis (58), in which the roller contacts and transmits traction forces between coaxial rotatable discs (61, 62), presenting input and output races (85, 87) conforming to different parts of the surface of a single torus defining a midplane and in so doing are subjected to traction forces at disc/roller contacts (86, 88), and an operating mechanism having a fixed part (72) and a movable part (71), the movable part being reciprocal over a stroke of operating movement and operable to apply a predetermined control force to a location on the carriage, with the control force acting solely along an axis including both the location on the carriage and the roller centre and in which the operating mechanism and carriage seek an equilibrium position in which the resultant of the control force and of the traction forces experienced by the roller assembly is zero when resolved in the same direction in a plane normal to the axis of the discs, wherein:

the carriage includes a rigid structure relative to which the roller axis (58) and the roller center (66) are fixed:

the operating mechanism includes means capable of effecting translational movement of the roller centre (66) back and forth along a path dictated by the two disc/roller contacts;

means allowing the roller (60) freedom to rotate about a diameter thereof so as to change the transmitted ratio of the CVT;

the axis (58) and the roller centre (66) are fixed relative to the carriage (67);

the roller centre (66) is positioned to impose no loads on the carriage (67) nor on the operating mechanism other than to produce the balance between the control force and the traction forces experienced by the roller assembly, in the plane normal to the axis of the discs; and the two disc/roller contacts (86, 88) and the location (82) at which the control force is applied to the roller assembly define a triangular relationship establishing a triangle of forces acting in the same plane.

33. A CVT according to claim 32 wherein said no loads are achieved by allowing the roller centre to move through intersecting arcs which lie in different intersecting planes.

34. A CVT of the toroidal race, rolling traction type in which a roller assembly comprises a carriage (67), bearings (64, 65) mounted on the carriage and a roller (60) defining a roller centre (66) supported by the bearings, for rotation about a roller axis (58), in which the roller contacts and transmits traction forces between coaxial rotatable discs (61, 62), presenting input and output races (85, 87) conforming to different parts of the surface of a single torus defining a midplane and in so doing are subjected to traction forces at disc/roller contacts (86, 88), wherein:

the roller assembly is supported at three points only, namely the two contacts (86, 88) of the roller (60) with the discs (61, 62) and a single point of support (82) defined by a supported operating mechanism that applies a control force to the assembly at the point of support, the single point of support permitting the roller center to freely follow a path dictated by the two disc/roller contacts when the roller assembly is moved by the control force while constraining the application of the control force to a control axis (83) passing through the single point of support (82) and the roller centre (66);

the operating mechanism and carriage seek an equilibrium position in which the resultant of the control force and of the traction forces experienced by the roller assembly is zero when resolved in the same direction in a plane normal to the axis of the discs;

the roller (60) is free to rotate about the control axis (83).

35. A CVT of the toroidal race, rolling traction type in which a roller assembly comprises a carriage (67), bearings (64, 65) mounted on the carriage and a roller (60) defining a roller centre (66) supported by the bearings, for rotation about a roller axis (58), in which the roller contacts and transmits traction force between coaxial rotatable discs (61, 62), presenting input and output races (85, (87) conforming to different parts of the surface of a single torus defining a mid-plane and in so doing are subjected to traction forces at disc/roller contacts (86, 88) wherein:

a supported operating mechanism has means for applying a control force to a roller assembly always along a control axis (83), passing through a single point (82) of constraint defined by the mechanism and the roller centre (66), means at the constraint point (82) allowing the roller centre freedom to follow a path dictated by the two disc/roller contacts when the roller assembly is moved by the control force, the roller being located by only three points, namely the constraint point (82) and the two disc/roller contacts (86, 88);

the operating mechanism and carriage seek an equilibrium position in which the resultant of the control force and of the traction forces experienced by the roller assembly is zero when resolved in the same direction in a plane normal to the axis of the discs;

the roller (60) is free to rotate about the control axis (83).

* * * * *